USO11144272B2

(12) United States Patent
Li et al.

(10) Patent No.: US 11,144,272 B2
(45) Date of Patent: Oct. 12, 2021

(54) FAN DISPLAY APPARATUS, DISPLAY METHOD AND FAN DISPLAY VIDEO WALL SYSTEM

(71) Applicants: SHENZHEN FRIDA LCD CO., LTD, Shenzhen (CN); SHENZHEN FAN DISPLAY TECHNOLOGY CO., LTD, Shenzhen (CN)

(72) Inventors: Zhuang Li, Shenzhen (CN); Li Li, Shenzhen (CN)

(73) Assignees: SHENZHEN FRIDA LCD CO., LTD, Shenzhen (CN); SHENZHEN FAN DISPLAY TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 17/019,406

(22) Filed: Sep. 14, 2020

(65) Prior Publication Data

US 2021/0224018 A1  Jul. 22, 2021

(30) Foreign Application Priority Data

Jan. 17, 2020  (CN) .......................... 202010055319.X

(51) Int. Cl.
*G09G 3/02* (2006.01)
*G06F 3/14* (2006.01)
*F04D 29/34* (2006.01)

(52) U.S. Cl.
CPC ............ *G06F 3/1446* (2013.01); *F04D 29/34* (2013.01)

(58) Field of Classification Search
None
See application file for complete search history.

(56) References Cited

U.S. PATENT DOCUMENTS

2004/0009070 A1\*  1/2004  Bird ...................... F04D 29/329
                                                          416/238
2019/0035317 A1\*  1/2019  Rohena .................. G09G 3/005

\* cited by examiner

*Primary Examiner* — Carl Adams

(57) ABSTRACT

A display method of a fan display apparatus includes detecting a present display section of a blade portion of the fan display apparatus; acquiring the image data to be displayed; determining whether the present display section and the previous display section are the same; changing a present display mode of the display elements, if the present display section and the previous display section are not the same; displaying the image data according to the changed display mode. A fan display apparatus and a fan display video wall system are also provided. The present disclosure makes the three-dimensional sense of the visual stronger; the visual effect is shocking and the experience is great; create a completely new 3D advertising solution; and at the same time, the installation method is flexible and can be installed in shopping malls, convenience stores, newspaper booths and other places.

16 Claims, 4 Drawing Sheets

FAN DISPLAY APPARATUS, DISPLAY METHOD AND FAN DISPLAY VIDEO WALL SYSTEM

CROSS REFERENCE TO RELATED APPLICATIONS

The present application claims the benefit of Chinese Patent Application No. 202010055319.X filed on Jan. 17, 2020. The above is hereby incorporated by reference.

FIELD

The subject matter herein generally relates to a bracket for a mobile terminal.

BACKGROUND

It is well known that three-dimensional stereo vision of an object is generated by binocular parallax, and all optical devices or structures that can cause binocular parallax to the human eye can generate three-dimensional stereo vision. The holographic fan display is driven by the motor to rotate the LED light bar, and the LED on the LED light bar will display and create a 3D animation or video. Therefore, the holographic fan display apparatus can be applied in various fields. However, in an image display process of the existing holographic fan display, due to the limitation of the number of LEDs, the refresh rate is insufficient to generate high-definition images, which greatly reduces the display effect of the fan display.

BRIEF DESCRIPTION OF THE DRAWINGS

Implementations of the present technology will now be described, by way of example only, with reference to the figures.

DETAILED DESCRIPTION

Figure 1:
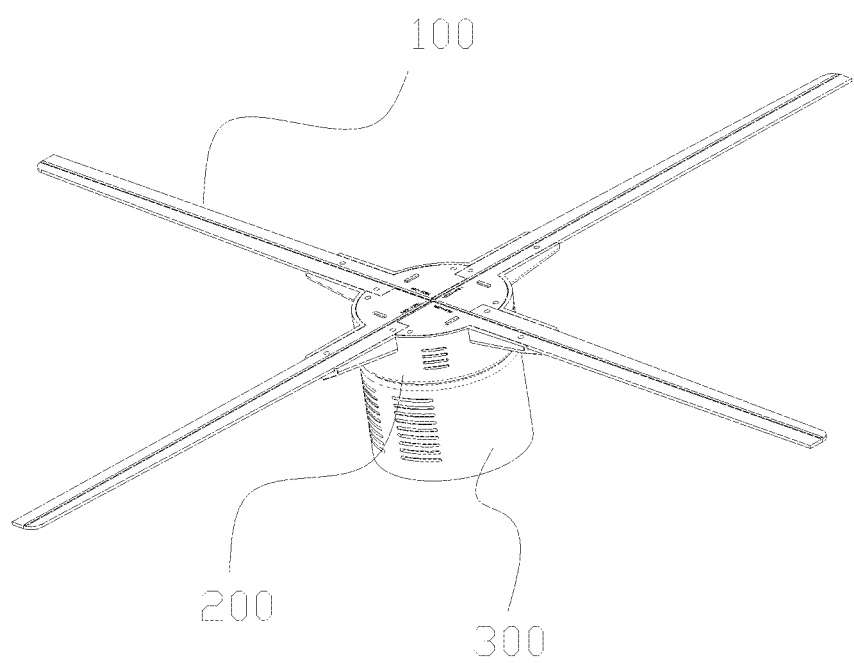
FIG. 1 is a structure diagram of one exemplary embodiment of a fan display apparatus.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiment described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "comprising," when utilized, means "including, but not necessarily limited to"; it specifically indicates open-ended inclusion or membership in the so-described combination, group, series and the like.

The present disclosure described in relation to a fan display apparatus, a display method, and a fan display video wall system to display image data.

Figure 2:
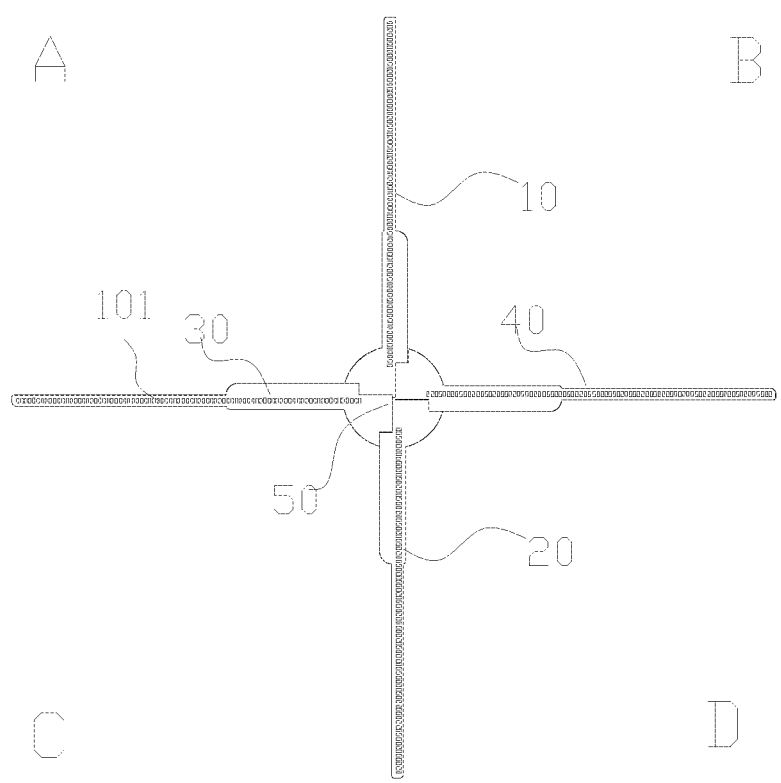
FIG. 2 is a structure diagram of one exemplary embodiment of the fan display apparatus illustrating display elements.

FIGS. 1 and 2 illustrate one embodiment of a fan display apparatus 1. The fan display apparatus 1 comprises a driving module 300, a control module 200, and a display module 100. The control module 200 is electronically connected to the driving module 300 and the display module 100. The display module 100 comprises a blade portion (not labeled) and a plurality of display elements 101. The plurality of display elements 101 is fixedly connected to one side of the blade portion away from the driving module 300. The blade portion comprises a plurality of fan blades. The plurality of fan blades intersects at an intersection point 50. In at least one embodiment, the blade portion comprises four fan blades: a first fan blade 10, a second fan blade 20, a third fan blade 30, and a fourth fan blade 40; the first fan blade 10, the second fan blade 20, the third fan blade 30, and the fourth fan blade 40 intersect at the intersection point 50. An angle between the first fan blade 10 and the second fan blade 20 is equal to an angle between the third fan blade 30 and the fourth fan blade 40. A width of each fan blade of the first fan blade 10, the second fan blade 20, the third fan blade 30, and the fourth fan blade 40 gradually decreases along a direction away from the intersection point 50.

In at least one embodiment, the fan display apparatus 1 drives a supporting portion 30 of the display module 100 to rotate through the driving module 300. The display element 101 fixedly connected to the supporting portion 30 is controlled by the control module 200 to emit alterable light source, and a display screen is formed by using the visual persistence factor, according to the alterable light source. Specifically, the first fan blade 10, the second fan blade 20, the third fan blade 30, and the fourth fan blade 40 intersect extend outward from the intersection point 50, the width of each fan blade of the first fan blade 10, the second fan blade 20, the third fan blade 30, and the fourth fan blade 40 gradually decreases along a direction away from the intersection point 50, each fan blade of the first fan blade 10, the second fan blade 20, the third fan blade 30 is an inverted triangle.

Figure 3:
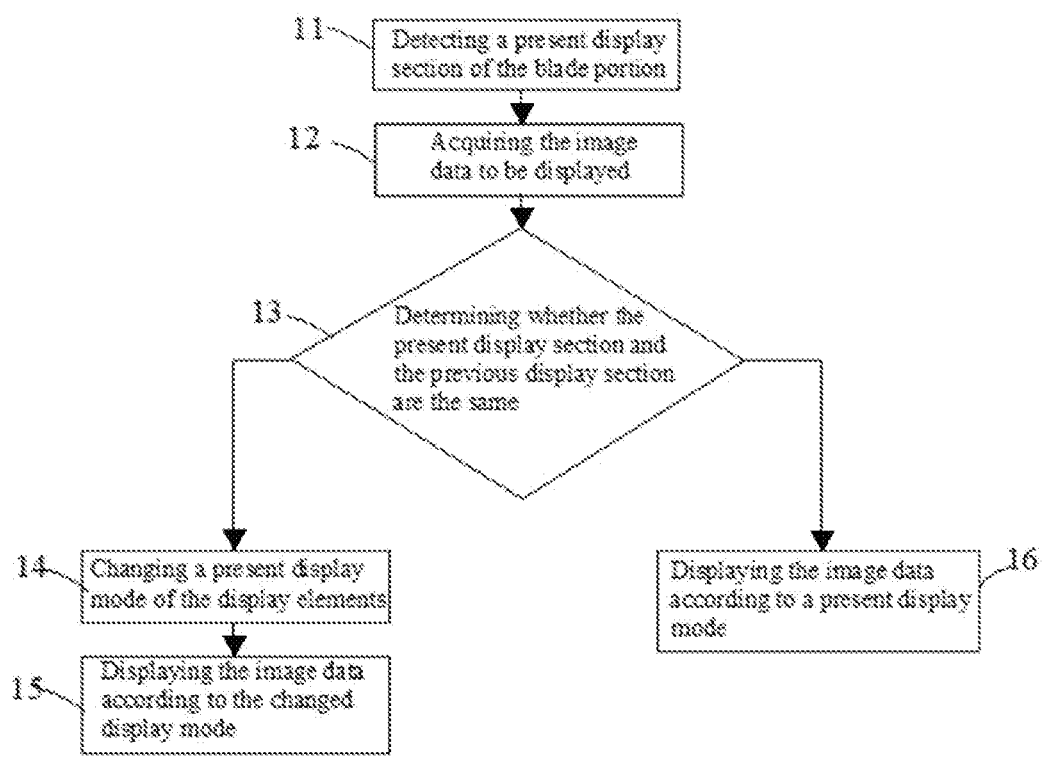
FIG. 3 is a flowchart of one exemplary embodiment of a display method of the fan display apparatus.

FIG. 3 illustrates a flowchart of a method in accordance with an example embodiment. A display method of a fan display apparatus is provided by way of example, as there are a variety of ways to carry out the method. The display method described below can be carried out using the configurations illustrated in FIGS. 1-2, for example, and various elements of these figures are referenced in explaining display method. The illustrated order of blocks is by example only and the order of the blocks can change. Additional blocks may be added or fewer blocks may be utilized without departing from this disclosure. The display method can begin at block 11.

At block 11, detecting a present display section of the blade portion.

At block 12, acquiring the image data to be displayed.

At block 13, determining whether the present display section and the previous display section are the same, if yes, the method goes to block 16; if no, the method goes to block 14. The present display section is a display section where the blade portion is located at present moment, the previous display section is a display section where the blade portion is located at previous moment.

At block 14, changing a present display mode of the display elements.

At block 15, displaying the image data according to the changed display mode.

At block 16, displaying the image data according to a present display mode.

In at least one embodiment, the blade portion comprises a first fan blade 10, a second fan blade 20, a third fan blade. 30, and a fourth fan blade 40. Each display element 101 of the first fan blade 10, the second fan blade 20, the third fan blade 30, and the fourth fan blade 40 comprises a plurality of display lamps (not labeled), the plurality of display lamps is separately arranged around starting at the intersection point. The display mode comprises a first mode of lighting the odd display lamps around from the intersection point 50 and a second mode of lighting the even display lamps around from the intersection point 50. Create a rectangular coordinate system with the intersection point 50, and the intersection point 50 is the center point of the rectangular coordinate system. The display section comprises a first quadrant A, a second quadrant B, a third quadrant C, and a fourth quadrant D, the four quadrants (A, B, C, D) are 8 display subsections. In at least one embodiment, the display section can be divided into 8 display subsections or 24 display subsections according to actual needs. Specifically, detect a position of the fan blade by Field Programmable Gate (FPGA). Understandably, because the angle between the first fan blade 10 and the second fan blade 20 is 90 degrees, the angle between the third fan blade 30 and the fourth fan blade 40 is also 90 degrees, thus, there is only one fan blade being in one quadrant at the same time. The image to be displayed is divided into a plurality of sections and is displayed by one fan blade, thereby enabling to greatly improved the refresh rate, the image data will be displayed completely and clearly. The image to be displayed is input. Specifically, the image to be displayed includes pixel information obtained by sampling the image. Understandably, the image to be displayed includes a plurality of pixels. The image to be displayed corresponding to each position of the fan blade is acquired, according to the detected each position of the first fan blade 10, the second fan blade 20, the third fan blade 30, and the fourth fan blade 40. The image to be displayed is displayed on the display lamps according to the present display mode. Specifically, the image to be displayed includes chrominance information of each pixel. When the fan blade rotates to one display section from another display section, the fan blade changes the display mode of the display element 101. For example, when the first fan blade 10 clockwise rotates to a second quadrant B from a first quadrant A, the previous display mode of lighting the odd display lamps of the display element, is changed to be the present display mode of lighting the even display lamps of the display element.

In at least one embodiment, when the fan blade is not detected to another display section, the method goes back to block 13. Specifically, when the fan blade rotates in the same display section, the blade portion only displays the image data to be displayed according to the present display mode. If the present blade portion rotates in the same display section, the odd display lamps is lighted to display the image data. In at least one embodiment, the blade portion refreshes one time when rotating 0.2 degree. In the embodiment, in the same quadrant, the fan blade refreshes up to 450 times. When each fan blade refreshes 450 times 450 in the same quadrant, thereby enabling to greatly improved the refresh rate, the image data will be displayed completely and clearly.

Preferably, after blade portion deflects, the display method further comprises the following steps:

detecting a deflection angle of the blade portion; and determining whether the deflection angle of the blade portion is reaching a predetermining refresh angle, if yes, the method goes back to block 11; if no, the method goes back the step of detecting a deflection angle of the blade portion.

Specifically, detect the present display section of each fan blade of the blade portion through detecting the deflection angle of the blade portion after ensuring an original position, to acquire the display section of the fan blade.

In at least one embodiment, the display section is displayed through the corresponding display mode, using vision to stay away from it to ensure the complete display of the display frame.

A fan display video wall system is also provided. The fan display video wall system comprises a plurality of fan display apparatus 1. Specifically, the image data to be displayed on the display system is divided into a plurality of display subsections 3, one fan display apparatus 1 displays the image data of one corresponding display subsection 3.

Figure 4:
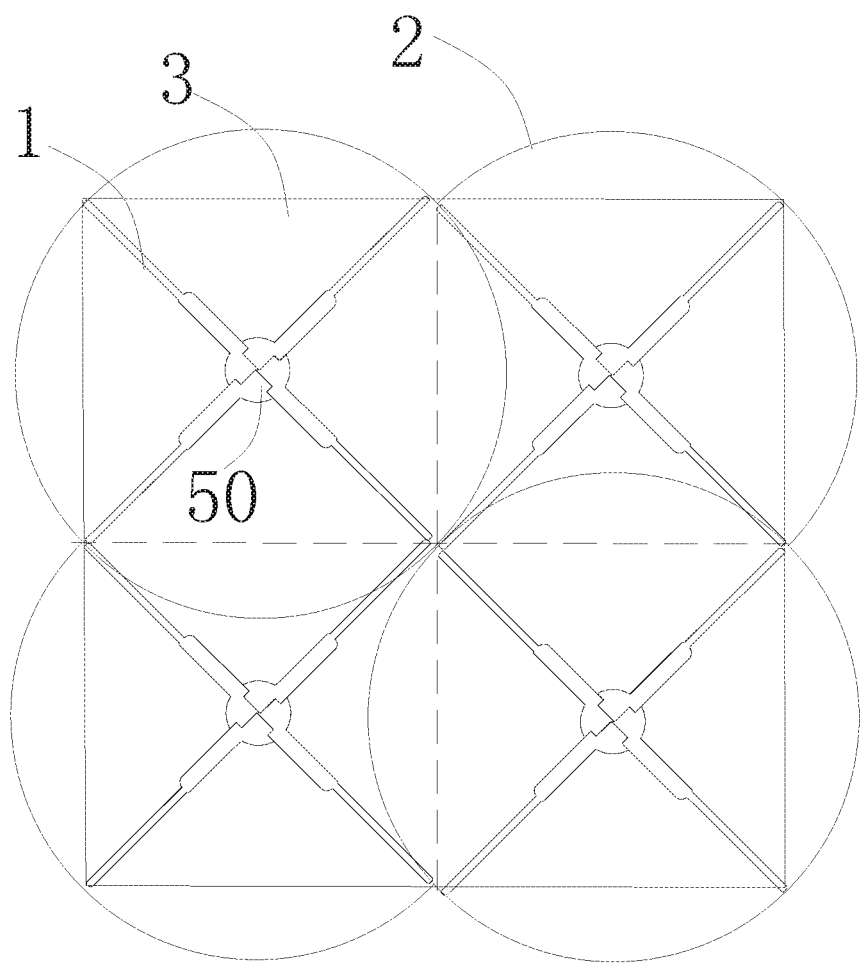
FIG. 4 is a structure diagram of one exemplary embodiment of a fan display video wall system.

Preferably, FIG. 4 illustrates one exemplary embodiment of a fan display video wall system having four fan display apparatus 1. The fan display video wall system comprises a plurality of fan blade rotating sections 2. Specifically, the fan blades of two neighboring fan display apparatus 1 are located on two different planes, and projection overlap is on the fan blade rowing sections 2 of two neighboring fan display apparatus 1. Specifically, the displayed image of a single fan display apparatus 1 is a circular image when single fan display apparatus 1 rotates, thus, the fan blade is arranged to be stagger in different planes and projection overlap is on the fan blade rotating sections 2, thereby the vacant position of the image to be displayed is reduced. Specifically, the width of the fan display apparatus 1 gradually decreases along a direction away from the intersection point 50. In at least one embodiment, the projection overlap is a part of the fan blade with the minimum width. When the fan blade projections overlap, by designing the width of the fan blade gradually decreases, thereby reducing the shadow impact on the fan blade overlap, thereby enabling the displayed image to be clearer.

In the embodiment, because the rotation range of a single fan display apparatus 1 is a circular section, when the display system needs to be spliced into a fan display video wall system, and if the fan blades are spliced on the same plane, a part of image may be missing, that the fan blades need to be located on two different planes, and by reducing the width of the fan blades to reduce the upper fan blades affecting the imaging of the lower fan blades.

In the embodiment, the width of the blade portion is improved to splice a bigger fan display video wall system. The fan display apparatus, the display method, and the fan display video wall system of the present disclosure makes the three-dimensional sense stronger, the visual effect is shocking and the experience is great, the advertising effect is great, at the same time, the installation method is flexible and can be installed in shopping malls, convenience stores, newspaper booths and other places.

The exemplary embodiments shown and described above are only examples. Many details are often found in the art such as the other features of a fan display apparatus, a display method, and a display system. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A display method of a fan display apparatus comprising:
   detecting a present display section of a blade portion of the fan display apparatus;
   acquiring the image data to be displayed;
   determining whether the present display section and the previous display section are the same;
   changing a present display mode of the display elements, if the present display section and the previous display section are not the same;
   displaying the image data according to the changed display mode; and
   displaying the image data according to a present display mode, if the present display section and the previous display section are the same;
   wherein each display element comprises a plurality of display lamps, the plurality of display lamps are separately arranged around starting at an intersection point, the display mode comprises a first mode of lighting the odd display lamps around from the intersection point and a second mode of lighting the even display lamps around from the intersection point.

2. The display method of claim 1, further comprising:
   detecting a deflection angle of the blade portion; and
   determining whether the deflection angle of the blade portion is reaching a predetermining refresh angle, if yes, the method goes back to the step of detecting a present display section of a blade portion of the fan display apparatus; if no, the method goes back the step of detecting a deflection angle of the blade portion.

3. The display method of claim 1, wherein the blade portion comprises a first fan blade, a second fan blade, a third fan blade, and a fourth fan blade, an angle between the first fan blade and the second fan blade is equal to an angle between the third fan blade and the fourth fan blade.

4. The display method of claim 3, wherein the first fan blade, the second fan blade, the third fan blade, and the fourth fan blade intersect at a point, the intersected point is a center point of a rectangular coordinate system where the current display area is located.

5. The display method of claim 3, wherein the angle between the first fan blade and the second fan blade is 90 degrees and the angle between the third fan blade and the fourth fan blade 90 degrees.

6. The display method of claim 1, wherein the blade portion comprises a first fan blade, a second fan blade, a third fan blade, and a fourth fan blade, an angle between the first fan blade and the second fan blade is equal to an angle between the third fan blade and the fourth fan blade.

7. The display method of claim 6, wherein the angle between the first fan blade and the second fan blade is 90 degrees and the angle between the third fan blade and the fourth fan blade 90 degrees.

8. The display method of claim 6, wherein the first fan blade, the second fan blade, the third fan blade, and the fourth fan blade intersect at an intersection point, the intersection point is a center point of a rectangular coordinate system where the current display area is located.

9. A fan display apparatus, comprising:
   a driving module;
   a display module comprising:
   a blade portion comprising a plurality of fan blades; and
   a plurality of display elements fixedly connected to one side of the blade portion away from the driving module; and
   a control module electronically connected the driving module and the display module;
   wherein the plurality of fan blades intersects at an intersection point;
   wherein a width of each fan blade gradually decreases along a direction away from the intersection point;
   wherein the fan display apparatus is configured to execute the display method of claim 1.

10. The fan display apparatus of claim 9, wherein the blade portion comprises a first fan blade, a second fan blade, a third fan blade, and a fourth fan blade, an angle between the first fan blade and the second fan blade is equal to an angle between the third fan blade and the fourth fan blade.

11. The fan display apparatus of claim 10, wherein the angle between the first fan blade and the second fan blade is 90 degrees and the angle between the third fan blade and the fourth fan blade 90 degrees.

12. The fan display apparatus of claim 10, wherein the first fan blade, the second fan blade, the third fan blade, and the fourth fan blade intersect at the intersection point, the intersection point is a center point of a rectangular coordinate system where the current display area is located.

13. The fan display apparatus of claim 12, wherein the angle between the first fan blade and the second fan blade is 90 degrees and the angle between the third fan blade and the fourth fan blade 90 degrees.

14. A display system video wall system, comprising: a plurality of fan display apparatus of claim 9.

15. The display system video wall system of claim 14, wherein the blade portion comprises a first fan blade, a second fan blade, a third fan blade, and a fourth fan blade, an angle between the first fan blade and the second fan blade is equal to an angle between the third fan blade and the fourth fan blade.

16. The display system video wall system of claim 14, wherein the fan blades of two neighboring fan display apparatus are located on two different planes, and projection overlap is on the fan blade rotating sections of two neighboring fan display apparatus.

* * * * *